Figure 5:
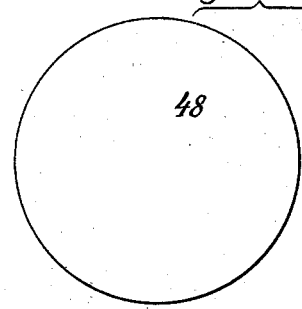

No. 664,516. Patented Dec. 25, 1900.
E. WATZKE.
MACHINE FOR MANUFACTURING CAPSULES FOR BOTTLES OR THE LIKE.
(Application filed June 25, 1900.)
(No Model.) 4 Sheets—Sheet 1.
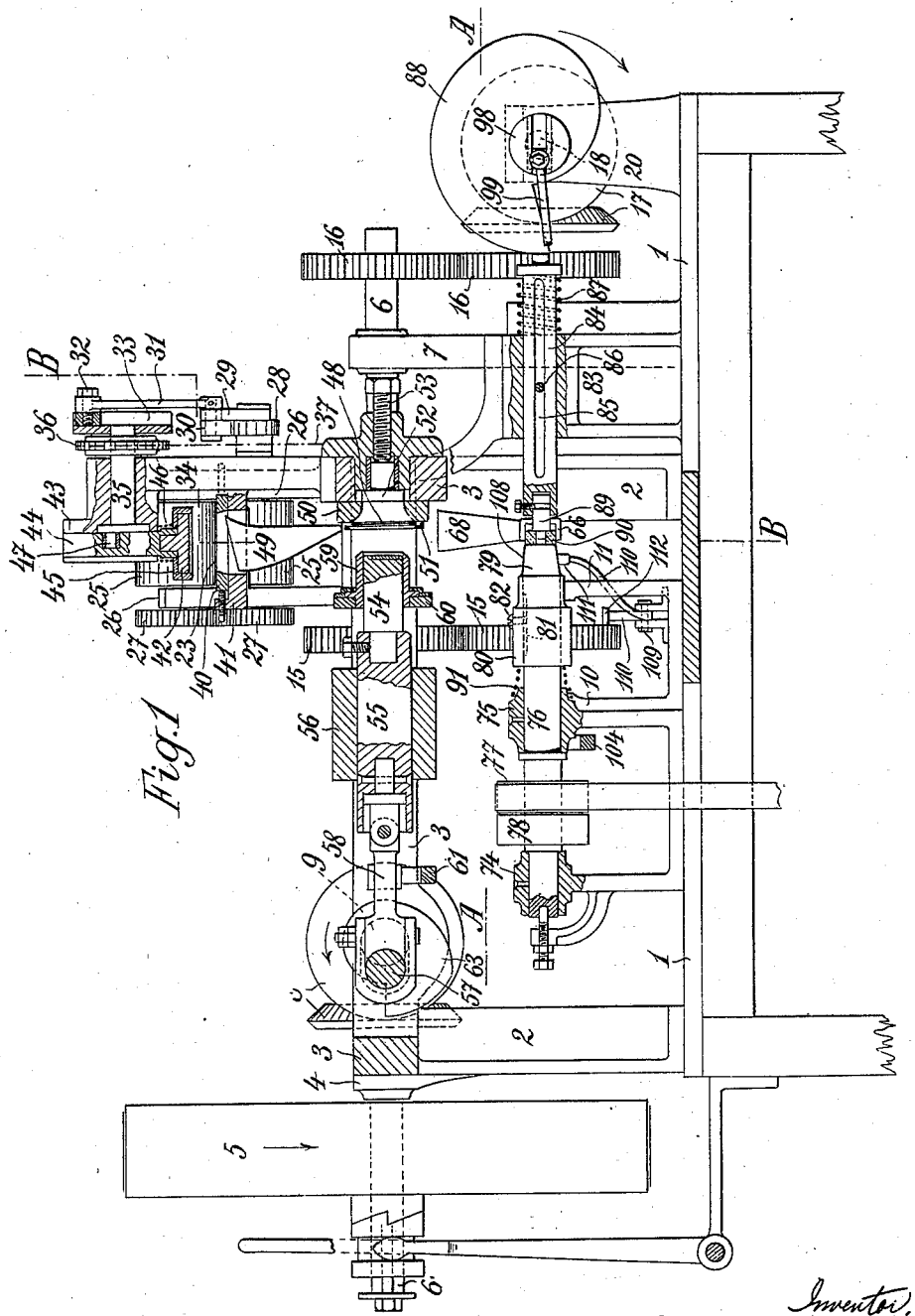

No. 664,516. Patented Dec. 25, 1900.
E. WATZKE.
MACHINE FOR MANUFACTURING CAPSULES FOR BOTTLES OR THE LIKE.
(Application filed June 25, 1900.)
(No Model.) 4 Sheets—Sheet 2.
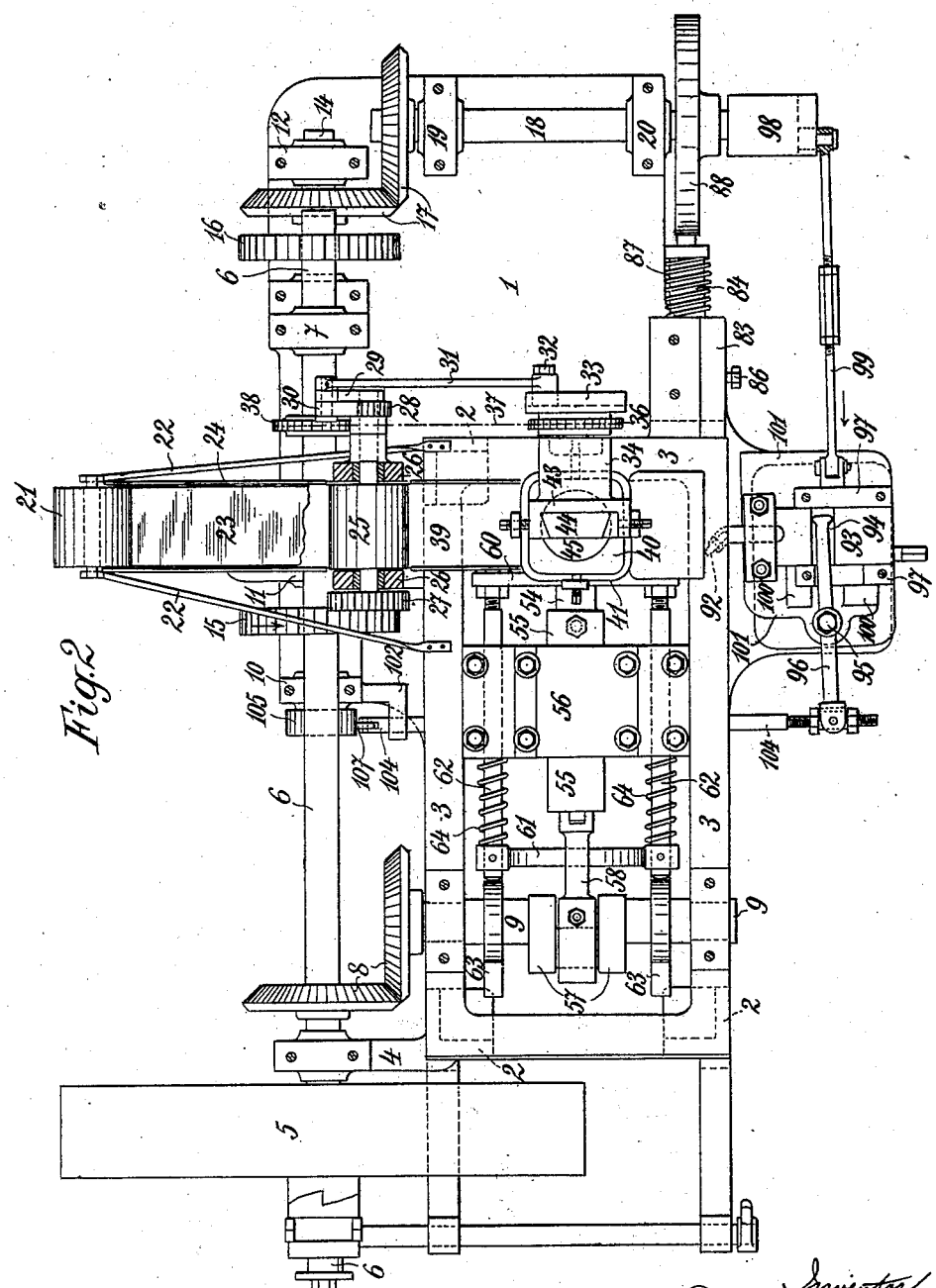

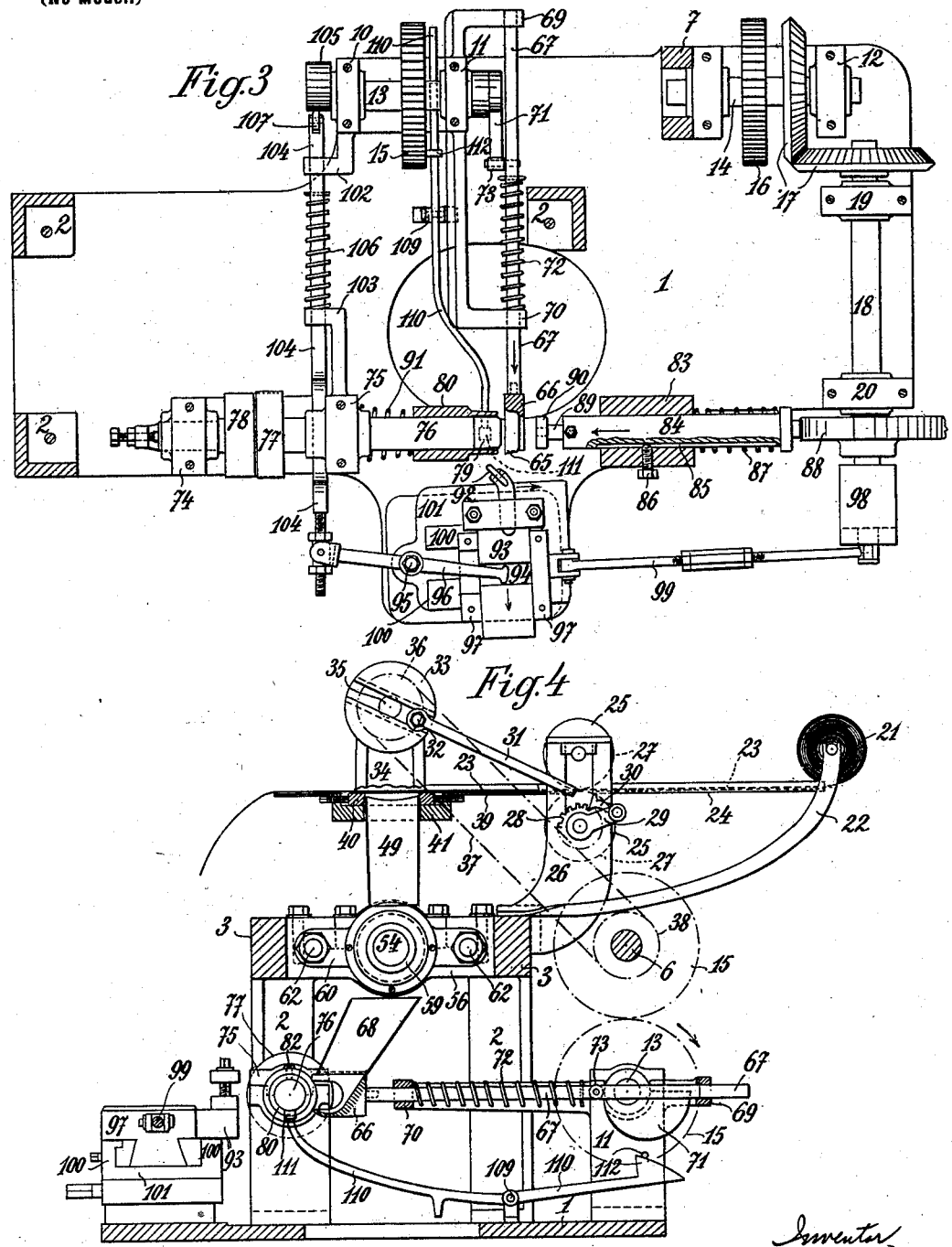

No. 664,516. Patented Dec. 25, 1900.
E. WATZKE.
MACHINE FOR MANUFACTURING CAPSULES FOR BOTTLES OR THE LIKE.
(Application filed June 25, 1900.)

(No Model.) 4 Sheets—Sheet 4.

Witnesses:

Inventor,
Edward Watzke

UNITED STATES PATENT OFFICE.

EDUARD WATZKE, OF FRIEDBERG, AUSTRIA-HUNGARY, ASSIGNOR OF ONE-HALF TO IGNAR NAGY, OF SAME PLACE.

MACHINE FOR MANUFACTURING CAPSULES FOR BOTTLES OR THE LIKE.

SPECIFICATION forming part of Letters Patent No. 664,516, dated December 25, 1900.

Application filed June 25, 1900. Serial No. 21,571. (No model.)

*To all whom it may concern:*

Be it known that I, EDUARD WATZKE, a subject of the Emperor of Austria-Hungary, residing at Friedberg, in the Province of Styria, in the Empire of Austria-Hungary, have invented certain new and useful Improvements in Machines for the Manufacture of Capsules for Bottles or the Like; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of this invention is to construct a machine for making capsules for bottles and the like from tin-foil, which machine automatically and successively performs the transformations of the blank heretofore effected by three different machines—namely, the cutting out of a circular disk from an endless tin-foil strip, the drawing of this disk into the form of a cup or dish, and the stretching or extending of this cup or dish into the form of the finished capsule—and therefore only requires the insertion of the strip to be worked from time to time, but does not require to be specially watched.

This machine comprises, essentially, a cutting press or punch to which the tin-foil strip is fed by two intermittently-actuated feed-rollers, a drawing press or punch of known construction into which the disk cut by the first press or punch falls, an adjustable feed-hopper which receives the blank falling down out of the drawing-press, and a stretching device in which the dished blank is introduced by the feeding device in order that it may be stretched by an automatically-controlled pressure-roller, and thus brought into its final form. A machine of this kind is shown in the accompanying drawings, in which—

Figure 6:
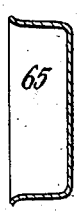
Figure 7:
Figure 8:
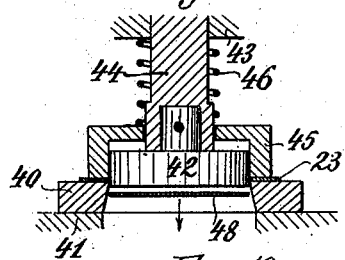
Figure 9:
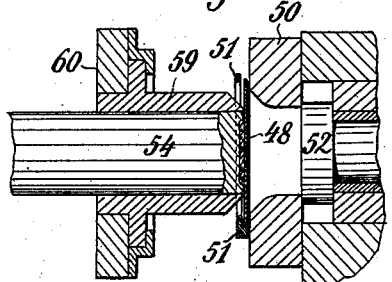
Figure 10:
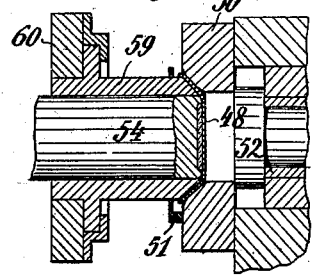
Figure 11:
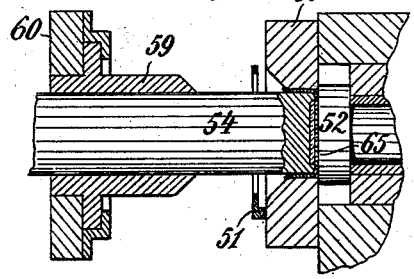
Figure 12:
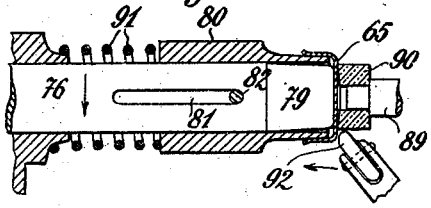
Figure 13:
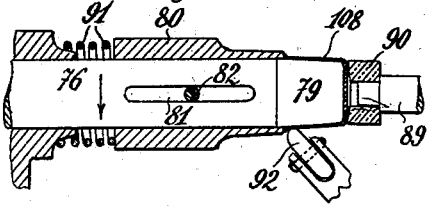

Figure 1 is a longitudinal section thereof; and Fig. 2 is a plan, partly in section. Fig. 3 is a horizontal section on the line A A, Fig. 1; and Fig. 4 is a vertical section on the line B B, Fig. 1. Figs. 5, 6, and 7 respectively show the cut-out disk, the dished blank, and the finished capsule. Fig. 8 is a vertical section through the cutting-press, with the punch depressed. Figs. 9, 10, and 11 show the drawing-press with the punch in three different positions. Figs. 12 and 13 show the stretching device in two positions, corresponding to the beginning and the end of the stretching.

On the base-plate 1 there rests on feet 2 a rectangular frame 3, which is provided with a bearing arm or bracket 4 for the main shaft 6, having at one end a belt-pulley 5, provided with means for throwing it into and out of gear. The main shaft 6 is supported at its other end in a bearing 7 and drives, by means of the bevel-wheels 8, the transverse shaft 9 for the drawing-press, mounted in the frame 3.

Beneath the shaft 6 the two short shafts 13 and 14 are mounted in bearings 10 11 and in the frame 7 and bearing 12, respectively, Fig. 3. These short shafts are driven from the main shaft 6 by means of the gear-wheels 15 16, respectively. The shaft 14 drives, by means of the bevel-wheels 17, the transverse shaft 18, which runs in bearings 19 20, mounted on the base-plate 1.

The tin-foil or sheet-tin to be worked is placed in the form of a roll 21 in bearings or recesses in arms 22, secured to the frame 3, and the strip of tin-foil 23 as it is drawn off is fed through a guide-channel 24 to the feed-rollers 25 25, which are mounted in two forked brackets 26, secured to the frame 3, and are connected together by interengaging gear-wheels 27. The driving of the feed-rollers is effected by means of a ratchet-wheel 28, mounted on the axis of the lower roller 25, in which ratchet-wheel there engages a pawl 30, mounted on the oscillating lever 29. The said lever 29 is connected by a link 31 with the adjustable pin 32 of the crank-disk 33, which is mounted on a short shaft 35, supported in the frames 34 and bearing a chain-wheel 36, which is driven by a chain 37 from a chain-wheel 38 of equal size, mounted on the shaft 6. Consequently at each complete revolution of the shaft 6 the tin-foil strip 23 is fed forward through a definite distance by the rollers 25 (this distance being capable of alteration by adjusting the crank-pin 32 in the groove of the disk 33) and is then held fast by the said rollers, which remain stationary after each forward motion. The tin-foil strip passes through the guide-channel 39 over the die or matrix 40 of the cutting-press, which is detachably secured to the perforated horizontal plate 41 of the frame 34. The punch 42 of the cutting-press is inserted into the lower end of a slide-block 44, movable in a vertical guide 43, mounted on the frame 34, and is surrounded by a stripping or ejecting ring 45, which is continually pressed downward by a spring 46. The punch is actuated by an eccentric-pin 47, mounted on the shaft 35, which pin engages in a horizontal groove in the slide-block 44, Fig. 1. While the feed-rollers 25 are at rest, the punch 42 moves down and cuts a circular disk 48 out of the tin-foil strip 23, Figs. 5 and 8. This disk 48 falls into a guide-channel 49 and from thence passes into a pocket 51, arranged in front of the die or matrix 50 of the drawing-press. In the upward motion of the cutting-punch 42 the ring 45, under the action of the spring 46, strips the perforated tin-foil strip from the punch 42.

The die or matrix 50 is detachably mounted in a common or well-known manner in front of an aperture in the frame 3, in which the die 52, which may be provided, if desired, with letters or other characters or devices, can be adjusted at will by means of the screw 53.

The punch 54 of the drawing-press is provided at its end with a let-in piece of lead and is secured in a plunger 55, which is guided horizontally in the cross-piece 56 and is driven from the shaft 9 by means of the crank 57 and connecting-rod 58. The punch 54 is concentrically surrounded by the sleeve 59, which is secured to a cross-piece 60, connected to rods 62, which are arranged on both sides of the plunger 55, are guided in the cross-piece 56, and are connected together by a transverse bar 61.

On the shaft 9 there are mounted opposite the end of the rod 62 cams 63, which serve for moving the sleeve 59 relatively to the die 50. The return motion of the sleeve 59 is effected by springs 64, which surround the rods 62 and bear against the cross-piece 56, Fig. 2.

In the position of the parts shown in Fig. 1 there is a disk 48 in the pocket 51. If the shaft 9 continues to turn in the direction indicated by the arrow, the punch 54 and the sleeve 59 are simultaneously moved relatively to the guide 50. By reason of the form of the cams 63 the sleeve 59 remains stationary after it has reached the position shown in Fig. 10 and has pressed the disk 48 against the conical part of the recess in the die 50. During this operation the punch 54, which is driven by the crank 57, moves farther forward, brings the disk into the form of a cup or dish 65, Fig. 11, and imparts the desired impression to the bottom thereof. During this operation the steps of the cam 63 pass the ends of the rods 62, and the cross-piece 60, together with the sleeve 59, is moved back rapidly by the springs 64 into the position shown in Fig. 11. The punch 54 moves back, whereupon the now stationary sleeve 59 pushes the blank 65 away from the punch. The blank falls into an arrangement which feeds it to the stretching device arranged beneath the drawing-press. This feeding device consists of a forked piece 66, Fig. 4, which is secured to a horizontal rod 67 and is provided with a funnel-shaped extension 68, which conducts the falling blank into the fork 66, Fig. 3, in which it remains. The rod 67 is guided horizontally in two arms 69 70 on the bearing-bracket 11 and is driven by a stepped cam 71, mounted on the shaft 13. A spring 72 presses the rod 67 by means of the roller 73 continually against the periphery of the cam 71.

The stretching device consists of a horizontal spindle 76, running in bearings 74 75. It bears a fast pulley 77 and a loose pulley 78 and is driven at a high speed by means of a belt. On the right-hand end 79 of the spindle 76, Fig. 1, which is made somewhat conical, corresponding to the form of the finished capsule, is mounted a sleeve 80, which by means of a screw 82, engaging in a longitudinal slot 81 in the spindle 76, is guided on the latter. This sleeve is reduced at its right-hand end in such a manner that it fits into the recess in the blank 65 and is continually pushed toward the right by means of a spring 91. As an extension of the spindle 76 there is arranged a horizontal sliding rod 84, guided in a bracket 83, the rod 84 being prevented from rotating by a screw 86, engaging in a groove 85 therein, and being pressed constantly by a spring 87 against the periphery of the stepped cam 88, which actuates it, and is mounted on the shaft 18.

On the left-hand end of the rod 84 is pivotally mounted a punch 89, which bears an india-rubber ring 90.

92 is the pressure or spinning roller, which can be introduced, with its holder, into a slide-block 93, which is capable of being moved perpendicularly to the spindle 76. The said slide-block is guided in a slide 97 and is provided with a transverse groove 94, in which engages the end of a lever 96, pivoted at 95. The slide 97 is itself actuated by a crank-disk 98, mounted on the end of the shaft 18, by means of the rod 99, and moves between guide-bars 100 of a carriage 101, bearing the pivot for the lever 96.

In the arms 102 and 103 on the bearing-brackets 10 and 75 there is guided a horizontal rod 104, Fig. 3, which is curved in order to avoid the bearing 75 and is pivotally connected to the lever 96 at its front end. This rod is actuated by means of a cam 105, mounted on the shaft 13. A spring 106 presses the rod 104 by means of its roller 107 continually against the periphery of this cam. While the blank 65 is being stripped by means of the sleeve 59 from the punch 54 of the drawing-press, the feed-hopper 68 is in the position shown in Fig. 4, so that it receives the blank and conducts it into the fork 66. The rod 67 is now fed forward by the cam 71 and brings the fork 66, with the blank, into line with the stretching-spindle 76. The punch 89 moves, under the action of the cam 88, against the fork 66 and pushes the blank 65 onto the conical end 79 of the spindle and holds it fast thereon. Since the spindle rotates, the blank and the punches 89 90 must also rotate therewith. The fork 66 now springs back into its original position under the action of the springs 72. The pressure or spinning roller 92, which during this time has been moved back with the slide 97 toward the right, is moved by the lever 96, with the slide-block 93, toward the spindle and comes into the position shown in Fig. 12. From there the pressure or spinning roller, under the action of the disk-crank 98, moves along the spindle 76 and as it pushes back the sleeve 80 stretches the blank 65, which receives the form of the conical end 79 of the spindle 76. After the spinning-roller has reached its outermost position, Fig. 13, the lever 96 is rapidly oscillated by the spring 106 in such a manner that it removes the slide-block 93, and with this the spinning-roller
25 from the stretching-spindle. During this operation the sleeve 80, under the action of the spring 91, moves along the spindle and strips the finished capsule 108 from the spindle.

In order to prevent the stripped-off capsule, by reason of the rotation imparted to it by the spindle, from being shot out laterally, a lever 110 is pivotally mounted at 109 on the base-plate 1, which lever is provided at its front upper end with a small brake-shoe 111, of leather or other material. This lever is actuated toward the end of each stretching operation by a pin 112, mounted on the gear-wheel 15 in such a manner that its front end 111 touches the capsule 108, and therefore prevents it from rotating rapidly at the moment of stripping.

I claim—

1. In a machine for making tin-foil capsules for bottles, the combination of coöperating mechanisms comprising appliances for cutting circular blanks from tin-foil, feeding devices for feeding a continuous sheet or strip of foil to said appliances, forming appliances for imparting a cup shape to the discoidal blanks, feeding devices for feeding the blanks to the forming appliances, spinning mechanism for spinning out and finishing the cup-shaped blank, and feeding devices for feeding said blank to the spinning appliances, substantially as set forth.

2. A machine such as described, comprising a discoidal cutter-die and a reciprocating punch, feeding appliances for intermittingly feeding a continuous sheet or strip of foil to said die and punch, forming appliances comprising a mandrel and shaping-die operating to impart a cup shape to the discoidal foil blanks, feeding devices for feeding said blanks to the forming appliances, spinning appliances comprising a revoluble mandrel and coöperating spinning-wheel, and mechanism for feeding the cup-shaped blanks to said spinning appliances, substantially as described.

3. A machine such as described, comprising a discoidal cutter-die, a coöperating reciprocating punch and a discoidal spring-actuated holder or presser, feed mechanism for feeding a continuous sheet or strip of foil to the cutting appliances, comprising intermittingly-rotating feed-rolls, forming appliances comprising a flaring die 50, a coöperating reciprocating plunger 54, and a stripper-sleeve 59 mounted thereon and having motion with and independently of said plunger, said sleeve having its outer end beveled to fit the flaring end of the die, feed mechanism comprising a pocket 51 for the reception of the discoidal foil blank and a suitable chute leading from the cutting appliances to said pocket, spinning appliances comprising a revoluble mandrel 76 a stripping-sleeve 80 mounted thereon and having motion with and independently of said mandrel, and a revoluble spinning-wheel having motion toward and from and lengthwise of the mandrel and coöperating therewith to spin out the formed blank, and feed mechanism comprising the reciprocating forked holder 67, a suitable chute leading from the forming appliances to said holder, and a plunger 84 reciprocating in the plane of the mandrel to push the cup-shaped blank from the holder onto said mandrel and hold such blank thereon during the spinning out, said plunger having a revoluble head, substantially as described.

4. The combination with the revoluble mandrel 76, the spring-actuated sleeve 80 mounted to slide on and revolve with said mandrel, the slide-rod 84 having revoluble head 90, the shaft 18 carrying cam 88 acting on rod 84, the spring 87 acting to hold said rod in contact with its cam, and a spinning-wheel coöperating with the mandrel 76 to spin or draw out the blank; of the forked spring-retracted feeder 66, 67, constructed to receive the formed cup-shaped foil blank, the shaft 13 and the cam 71 thereon, substantially as and for the purpose set forth.

5. The combination with the revoluble mandrel 76, its sleeve 80 and the rod 84 having revoluble head 90 in line and coöperating with said mandrel to hold the cup-shaped foil blank thereon, and a spinning-wheel movable toward and from and along the mandrel, operating to spin or draw out said blank; of a rock-lever provided with a brake-shoe, and means for rocking said lever to move its brake-shoe into contact with the finished capsule as it is being stripped from the mandrel, substantially as and for the purpose set forth.

6. The combination with the spinning appliances comprising a revoluble mandrel for the reception of a dished foil blank, a spinning-wheel having motion toward, from and along said mandrel, a holder for holding the blank on the mandrel during the operation of spinning, and means for moving said holder out of contact with the spun-out or finished capsule; of a spring-actuated stripper-sleeve mounted to slide on and revolve with the mandrel, said sleeve moved against the stress of its spring by the spinning-wheel as it moves along said mandrel, a brake-lever, and mechanism for moving said lever into contact with the finished capsule when the spinning-wheel moves out of contact with it and the stripping-sleeve is thrown forward by its spring to strip the capsule off the mandrel, substantially as and for the purpose set forth.

7. The combination with the revoluble mandrel 76, its sleeve 80 and the rod or plunger 84 having revoluble head 90; of the slide-carriage 97, the slide 93 carrying the spinning-wheel 92, the shaft 18, the eccentric 98 thereon and the connecting-rod 99 connected with slide-carriage 97 and imparting motion thereto lengthwise of mandrel 76, the lever 96 taking in a transverse groove in slide 93, and means for periodically oscillating said lever to move said slide and the spinning-wheel periodically into and out of contact with the aforesaid mandrel, substantially as and for the purpose set forth.

In testimony that I claim the foregoing as my invention I have signed my name in presence of two subscribing witnesses.

EDUARD WATŽKE.

Witnesses:
JOSEF RÜBRARCH,
ALVESTO S. HOGUE.